United States Patent
Conrath

(10) Patent No.: US 7,103,770 B2
(45) Date of Patent: Sep. 5, 2006

(54) POINT-TO-POINT DATA STREAMING USING A MEDIATOR NODE FOR ADMINISTRATION AND SECURITY

(75) Inventor: Bartley C. Conrath, Alexandria, VA (US)

(73) Assignee: Web Data Solutions, Inc., Arlington, VA (US)

(*) Notice: Subject to any disclaimer, the term of this patent is extended or adjusted under 35 U.S.C. 154(b) by 576 days.

(21) Appl. No.: 09/771,333

(22) Filed: Jan. 26, 2001

(65) Prior Publication Data

US 2001/0037461 A1 Nov. 1, 2001

Related U.S. Application Data

(60) Provisional application No. 60/178,453, filed on Jan. 27, 2000.

(51) Int. Cl.
*H04L 9/32* (2006.01)
*H04N 7/16* (2006.01)

(52) U.S. Cl. ............................ 713/155; 726/27; 726/4; 725/25; 709/231; 713/153

(58) Field of Classification Search ................ 713/201, 713/200, 153, 155; 725/25; 707/1, 9, 10; 709/231, 217, 219, 223, 225, 229; 726/27, 726/4

See application file for complete search history.

(56) References Cited

U.S. PATENT DOCUMENTS

| | | | | |
|---|---|---|---|---|
| 5,550,982 A | * | 8/1996 | Long et al. | .................... 725/93 |
| 5,930,473 A | * | 7/1999 | Teng et al. | .................. 709/204 |
| 6,223,292 B1 | * | 4/2001 | Dean et al. | .................. 713/202 |
| 6,711,622 B1 | * | 3/2004 | Fuller et al. | ................. 709/231 |
| 6,996,094 B1 | * | 2/2006 | Cave et al. | .................. 370/356 |

* cited by examiner

*Primary Examiner*—Emmanuel L. Moise
*Assistant Examiner*—Zachary A. Davis
(74) *Attorney, Agent, or Firm*—Whitham, Curtis, Christofferson & Cook, PC

(57) ABSTRACT

A system and method for point-to-point data streaming over a TCP/IP network. A Sender node serves data to the network, with one or more Viewer nodes receiving the data. A Mediator node provides administration and security and a static Internet location for accessing the system. As a result of the administration and security provided by the Mediator node, the data are communicated directly between the Sender and Viewer thereby minimizing resources and costs required for the Mediator. The Mediator node comprises a web server, an administrator and a database. An optional fourth MediaRelay node is provided to which the data are sent by the Sender and from which the data are received by multiple Viewers. The MediaRelay node permits a Sender having low bandwidth to service multiple Viewers.

The Mediator uses versioning control to upgrade MediaSender software at the Sender node, and stores in a database information provided by a Sender during a registration procedure. At login by the Sender, the Sender is authenticated and the Mediator unlocks the MediaSender software. At login by the Viewer, the Viewer is authenticated and the Mediator downloads viewing software to the Viewer. Authentication is based upon information in the database provided by the Sender at registration. Upon authentication of both Sender and Viewer, the Mediator sends both nodes a key enabling bi-directional communication between Sender and Viewer using respective sockets which are maintained until the communication is terminated by the Sender or the Viewer.

22 Claims, 4 Drawing Sheets

POINT-TO-POINT DATA STREAMING USING A MEDIATOR NODE FOR ADMINISTRATION AND SECURITY

This patent application claims priority from U.S. provisional application 60/178,453 of the same title filed on Jan. 27, 2000.

BACKGROUND OF THE INVENTION

1. Field of the Invention

This invention relates to the field of distributed client/server computing systems over TCP/IP networks. More specifically, the invention is an architecture that enables average Internet users to provide their own streaming data broadcasting services.

2. Background Description

As Internet use has become more prevalent, there has been an increased interest by average users to offer streaming data broadcasting services of their own. One such example is the ability to transmit live video from home computers for the purpose of remote monitoring. This undertaking is still prohibitive for the average user. The cost and difficulty of acquiring and installing the software necessary to offer generalized services over the Internet is usually prohibitive. Proper access control and security are also a problem. Those that are successful at setting up basic Internet services often do not understand the procedure necessary to configure and maintain access control lists to keep their systems safe from outside tampering and interception. One of the most significant barriers is that the average Internet user does not receive a static Internet address from his or her Internet Service Provider (ISP). This means that each time he or she connects to the Internet, the hosting system receives a different Internet address effectively preventing others from accessing the system in a consistent manner. This is similar to receiving a different phone number every day. There is no easy way for a viewer to know where to contact a server. If average Internet users wish to offer their own Internet services, it is desirable to have these highly technical issues handled transparently without complex procedures.

Prior art approaches to live streaming video or other data services fall into two categories: the Two-Node Architecture or the Linear Three-Node Architecture. The first and most common approach is the Two-Node Architecture. With this architecture, the user/source of data services (the Sender) sets up a server on the Internet, which is then available to one or more Viewers. An advantage of this approach is that the data stream is connected directly between the Viewer's and the Sender's server. This allows a strong level of privacy and security and at the same time allows the Viewer to control its individual data stream. However, a drawback of this approach is that it requires the Sender to acquire, install, configure and maintain his or her own Web server system and utilize a static IP address. When a requester or Viewer wishes to receive data on a remote computer, he or she must know how to locate the machine with the data (the Sender's server) and then have access to the functions required to send that data to the Viewer.

The ability to locate the Sender's server is difficult with most Internet services because of the prevalence of dynamic Internet addressing. With dynamic Internet addressing, the Viewer will not have a consistent address to use in order to retrieve data from the server. Finally, when the Viewer locates the Sender's server machine, he or she must have proper access permissions. If the person owning the server (the Sender) does have a static Internet address, he or she must still install, configure and maintain his or her own complex World Wide Web site and must enforce security policies to prevent unauthorized access and tampering ("hacking"). These tasks are difficult and cumbersome for the average Internet user.

Since this approach is not a database-centric approach, there are also further difficulties in providing features such as status, logging, and session handling. The Two-Node Architecture is more difficult to configure than other architectures, and for the average Internet user this often results in limited system security and breaches of system integrity. Another drawback of this approach is that all of the components including the server and the Web site must reside on the same physical machine, thereby reducing scalability. Further, this system is prohibitively costly and complex for the average user. These problems are typical of a two-node client/server architecture where you have a direct connection between the Viewer and the Sender's server.

Other systems attempt to overcome the problems of the Two-Node Architecture by adding a third node. These systems use a Linear Three-Node Architecture. Both the Viewer and Sender's server connect to a third node, called the Mediator Node, which has a static Internet address. This connection model solves the location problem because the Viewer does not need to know where the server of interest is located. It simply connects to the Mediator Node. This approach also overcomes the access problem. The Mediator Node handles the authentication of the Viewer and ensures that he or she has the permissions necessary to connect to the Sender's server. This approach does not require the Sender to maintain a Web site; it can use a database-centric approach, and can offer greater scalability. Furthermore, the Sender has the potential to establish access control lists using the centralized Web site of the Mediator Node.

However, this approach has a serious drawback: the Mediator Node must handle the actual data stream from the server to the viewer. This process creates several problems. First, the Mediator Node must be able to handle the increased resource requirements, and so this approach does not scale well when many Viewers are using the system. Secondly, there is a reduction in privacy and control, since all of the Sender's streaming data are now accessible to the Mediator Node. Once the Viewer's and Sender's server are connected through the Mediator Node, all of the data requested by the Viewer must travel through the Mediator Node before reaching the Viewer.

A further approach (taken by InetCam) is to use a third Mediator node just to handle location information. This approach uses a dynamic DNS service to allow clients to locate the video source. However, this requires that the user handle the security and access controls on the Sender side. This includes setting up and configuring a bundled web server including creating user access accounts and creating a web site. This approach makes the system difficult for the end user.

An additional approach (taken by iFriends) uses a Mediator node but does not allow the user to stop and start a stream using the viewer applet directly. Accessing or leaving a web page controls the stream. The web server handles the session tracking. This reduces the user's control over a stream requiring them to leave or close a web page to stop the stream. As a result, this system is not suitable for remote monitoring. This approach does not allow a user to simply leave their viewer software open without actually accessing the stream. This negatively impacts network bandwidth.

SUMMARY OF THE INVENTION

It is therefore an object of the present invention to provide a system for point-to-point data streaming which enables the average Internet user (as a Sender) to establish a data services node.

A further object of the invention is to provide security for Viewer access to such data services.

It is also an object of the invention to handle highly technical issues, such as providing viewers with an address for such data services, transparently and without complex procedures.

Another object of the invention is to provide a scalable system for point-to-point data streaming.

A further object of the invention is to provide a system which has the access control and security maintained by the Mediator node, thereby reducing the complexity and making the system much easier to set up and use.

It is also an object of the invention to allow average Internet users to deliver their own video or other streaming data over the Internet with minimal setup and for a low cost.

Yet another object of the invention is to provide a Mediator Node for server location storage and access control functionality, but without the need to transmit data through the Mediator Node.

Another object of the invention is to provide for remote monitoring which allows a user to leave the viewer software readily available in a web page, but does not use network bandwidth until the user starts the stream from within the viewer controls.

It is also an object of the invention to provide a simple mechanism for including a variety of data types for transmittal by the Sender.

A further object of the invention is to permit asynchronous data transmission initiation. This means that a user does not need to be present at both the Sender and the Viewer nodes at the same time to initiate the transmission. This object allows the invention to be used for purposes such as remote monitoring.

It is also an object of the invention to provide a built in session tracking system separate from any web server, using tokens that are passed around the system to track a viewer's actions such as stopping and starting a video stream, thereby allowing more modularity and giving the user direct control over the video stream they are accessing and for how long they wish to access it.

It is a further object of the invention that the Mediator Node function as a supporting World Wide Web server for the server sending the data.

Another object of the invention is to ensure that Sender and Viewer software is up-to-date.

It is an object of the invention that the Mediator Node control access and maintain security.

A further object of the invention is to provide a modular system allowing functional components to be distributed amongst multiple physical components.

Another object of the invention is to minimize the resources and cost required to maintain the Mediator Node.

The disclosure herein describes a system and method for point-to-point data streaming over a TCP/IP network. The system comprises a Sender node for serving data to the network, one or more Viewer nodes for receiving the data, and a Mediator node, which provides administration and security and a static Internet location for accessing the system. It is a key aspect of the invention that, as a result of the administration and security provided by the Mediator node, the data are communicated directly between the Sender and Viewer thereby minimizing resources and costs required for the Mediator. The Mediator node comprises a web server, an administrator and a database. The invention provides an optional fourth MediaRelay node to which the data are sent by the Sender and from which the data are received by multiple Viewers. The MediaRelay node permits a Sender having low bandwidth to service multiple Viewers.

In the method according to the invention, the Mediator uses versioning control to upgrade MediaSender software at the Sender node, and stores in a database information provided by a Sender during a registration procedure. At login by the Sender, the Sender is authenticated and the Mediator unlocks the MediaSender software. At login by the Viewer, the Viewer is authenticated and the Mediator downloads viewing software to the Viewer. Authentication is based upon information in the database provided by the Sender at registration. Upon authentication of both Sender and Viewer, the Mediator sends both nodes a key enabling bi-directional communication between Sender and Viewer using respective sockets which are maintained until the communication is terminated by the Sender or the Viewer.

In one embodiment of the invention there is a Sender node for generating streaming data from a target site, a Viewer node for monitoring the target site using this data, and a Mediator node for remotely controlling direct transmission of the data from the Sender to the Viewer. Both the Sender and the Viewer are clients on a network. The Sender has an address on the network, and the Viewer can initiate, stop and restart the transmission asynchronously.

Another embodiment provides a method for registering Sender information with a Mediator node, including at least a Sender location and a list of Viewers having access rights, using a Mediator node to authenticate the Sender, requesting access to the Sender by a Viewer, logging the Viewer's request with said Mediator node in order to validate the Viewer against the list of Viewers, transmitting Sender location information to the validated Viewer and notifying the Sender of the validated Viewer, and downloading a videostreamer from the Sender (either directly or via another sender having a MediaRelay) to the Viewer.

The present invention overcomes the disadvantages of the approaches mentioned above through the creation of an Interconnected Three-Node Communication Architecture. Several aspects of this architecture illustrate its features and differences from other approaches.

1. Mediator Node Provides Location Information and Access Control

A fundamental aspect of this architecture is the use of the Mediator Node to provide server location storage and access control functionality without the need to transmit data through the Mediator Node. Other systems either do not allow for a remote access control and verification system, require the Sender's server machine to also run an expensive and complex Web server located on a fixed IP address, or they require that all data be wastefully re-transmitted through their administrative system. The invention describes a secure and effective means of controlling access to a protected data source that can be located on a dynamic Internet address with minimal technological skill and expense required of the Sender.

One aspect of this architecture is the Mediator Node function to record the actual Internet address, port, and hostname information necessary for a Viewer to find and access the Sender's server. This function is implemented in software which is stored on the Sender's server, and known as the MediaSender. The Sender's server machine may dynamically receive this information when the MediaSender connects to the Internet. Because the Mediator Node stores this information, it can later communicate it to a Viewer requesting data. The first step in the communication architecture (as discussed below in reference to FIG. 3) is for the MediaSender to register itself with the Mediator Node. This is equivalent to the MediaSender letting the Mediator Node know where on the Internet to find the Sender's data server.

The MediaSender Node does this by opening a TCP socket connection to a pre-assigned port of the Mediator Node, which is located at a fixed address, and then by sending a secure, encrypted token or key to the Mediator Node. Embedded in this key is the MediaSender's authentication and all of the local Internet address information for a Viewer to later make a connection to this MediaSender. If the Mediator Node successfully authenticates this MediaSender, then the Mediator stores the Internet information into its database.

2. Mediator Node Serves as Web Server

A second fundamental characteristic of the Invention is that the Mediator Node can function as a supporting World Wide Web server for the server sending the data. Some implementations of the Two-Node Architecture require the Sender to set up the software to host a World Wide Web site on the same machine that is providing data. The Viewer would then access the system by visiting the Web site hosted on this machine and downloading a viewer program or applet to receive the data. This viewer applet would then initiate the communication to the data server. This is generally expensive, complex, and opens several security holes, which could be used maliciously. The invention overcomes the requirement of the Sender to host a Web site. The Mediator Node behaves as the supporting Web server, which provides the necessary connectivity.

3. Mediator Node Ensures That MediaSender and Viewer Software is Up-To-Date

In addition to reducing complexity, increasing security, and decreasing cost, the Mediator Node has the extra benefit of enforcing consistent software versioning. If Senders need to maintain their own Web site, they would also need to ensure that they are offering the correct version of the viewer software. When the Viewer accesses the Mediator Node Web site and downloads the viewer applet, he or she is assured of getting the correct version along with all of the necessary Internet address information for the server to which he or she desires to connect.

4. Mediator Node Controls Access and Maintains Security

A fourth fundamental aspect of the invention is that the Mediator Node can control access and maintain security. The invention describes an architecture that requires both the Viewer and MediaSender nodes to use secure "keys" to unlock their functionality. Access control information is stored in a database that the Mediator Node maintains. This database contains information about who is allowed to access what data source using which passwords. For example, it may store a list of employees of the company operating the Mediator Node who each have their own passwords to access the company video source. Or, alternatively, it may contain a list of Viewers/Senders each of whom can access a live video from their own respective Sender cameras, with only one Viewer having access to each camera. This feature ensures that only those people with the correct authorization can obtain access to the data streams from the MediaSender and ensures that one MediaSender cannot masquerade as another. Other approaches that require the Sender to set up his or her own server also require the Sender to maintain an access list for security. In order to do this, the Sender needs to become familiar with the complexities of the Web server software and will frequently make mistakes that may compromise data security. The Invention moves that difficult task from the Sender to the Mediator Node.

The Mediator Node handles all user verification and user authentication tasks based on the Sender's use of a simple administrative system. The Sender can easily add and change Viewer login and password information through the secure use of the Mediator Node's administration web site. This simple Web-oriented task is a much more intuitive approach to creating an access list than the ungainly text editing required in many common Web site software packages. After the access list is created, it is stored in the Mediator Node's database. Furthermore, the special access control list to change the MediaSender configuration is also stored on the database at the Mediator Node. Any MediaSender server that wishes to provide data must connect to the Mediator Node and provide a valid authentication code. If the connecting MediaSender does not provide valid authentication, it will not be allowed to provide data, thus preventing "spoofing" and other security problems. When a Viewer connects, it must validate itself with the Mediator Node. If the authentication provided by the Viewer is valid for the particular data stream being requested, encrypted keys are sent to both the Viewer and the MediaSender nodes, unlocking them and allowing them to communicate directly with each other. In this manner, the system is inter-connected, since each of the three nodes can communicate with each other directly without having to route communications through the other node. The term "Interconnected Three-Node Architecture" refers to this scheme of pairwise communications between nodes.

5. Modularity of System Supports Multiple Data Types

A fifth aspect of the Invention is the inherent modular nature of the system. This modularity allows for each functional component to be replicated and distributed amongst multiple physical components and allows for the simple inclusion of a variety of data types for transmittal. This model has been used to provide live Internet streaming video; it could just as easily be extended to provide sensitive business information, secure personal communications, or audio.

6. Mediator Node Minimizes Resource and Bandwidth Costs

A sixth aspect is that the unique structure of this new Mediator Node minimizes the resources and cost required to maintain the Mediator Node. Other approaches, such as the Linear Three-Node Architecture, that use a Mediator Node for the hosting of streaming data through their Web site actually send the stream from the server to the Mediator Node and then through the Mediator Node to the viewer. This approach has several limitations. Since all of the communication goes through this intermediate node, it requires a much more powerful computer and a much greater bandwidth than is required by the present invention. Secondly, the other approaches do not offer the same level of privacy and security as the actual data stream goes through this "middleman." The other approach does not allow individual viewer control of the data stream since any control requests would need to be transferred through the Mediator Node to the server. The present invention surmounts all of these issues by opening up a direct two-way communication pipe between the Viewer and the MediaSender. There is no intermediary. This approach offers more security, privacy and control for the Sender and the Viewer, and allows for the minimization of requirements in equipment and bandwidth since the Mediator Node is used only for the security and registration of the Viewer and the Sender's server or MediaSender.

7. Mediator Node Permits Asynchronous Data Transmission

A seventh aspect of the Mediator Node is that it stores the status of Sender's server. When a Sender executes his software, the system automatically registers itself with the Mediator Node informing that it is ready to transmit data. There is no user intervention required such as manually logging into a directory system. The Mediator Node handles the ready status of the Sender, so that when a Viewer requests a data transmission at some later time, the system will know that the requested transmission is available to be initiated. The transmission does not begin until at least one Viewer connects to the Sender.

BRIEF DESCRIPTION OF THE DRAWINGS

The foregoing and other objects, aspects and advantages will be better understood from the following detailed description of a preferred embodiment of the invention with reference to the drawings, in which.

The invention will be better understood by reference to the following terms:

Java

Object-oriented programming language from Sun Microsystems.

MediaSender

The software component of the invention which is installed at the Sender's server node, and which performs the serving of the image and video data to the Viewer.

MediaSender Node

The node in the Interconnected Three-Node Architecture that serves the data from the Sender's server to the Viewer.

Mediator Node

The node in the Linear and Interconnected Three-Node Architectures that provides the location and access information and handles the security policy.

Requestor

Same as the Viewer. The person who is accessing the data from the MediaSender Node.

Sender

The person who configures the MediaSender Node and provides the data.

Viewer

The person who is accessing the data. Same as the requester.

Viewer Node

The node that represents the Viewer. The software used to access the data at the MediaSender Node is installed at this node. This software could be an applet in a browser or a standalone application.

DETAILED DESCRIPTION OF A PREFERRED EMBODIMENT OF THE INVENTION

Figure 1:
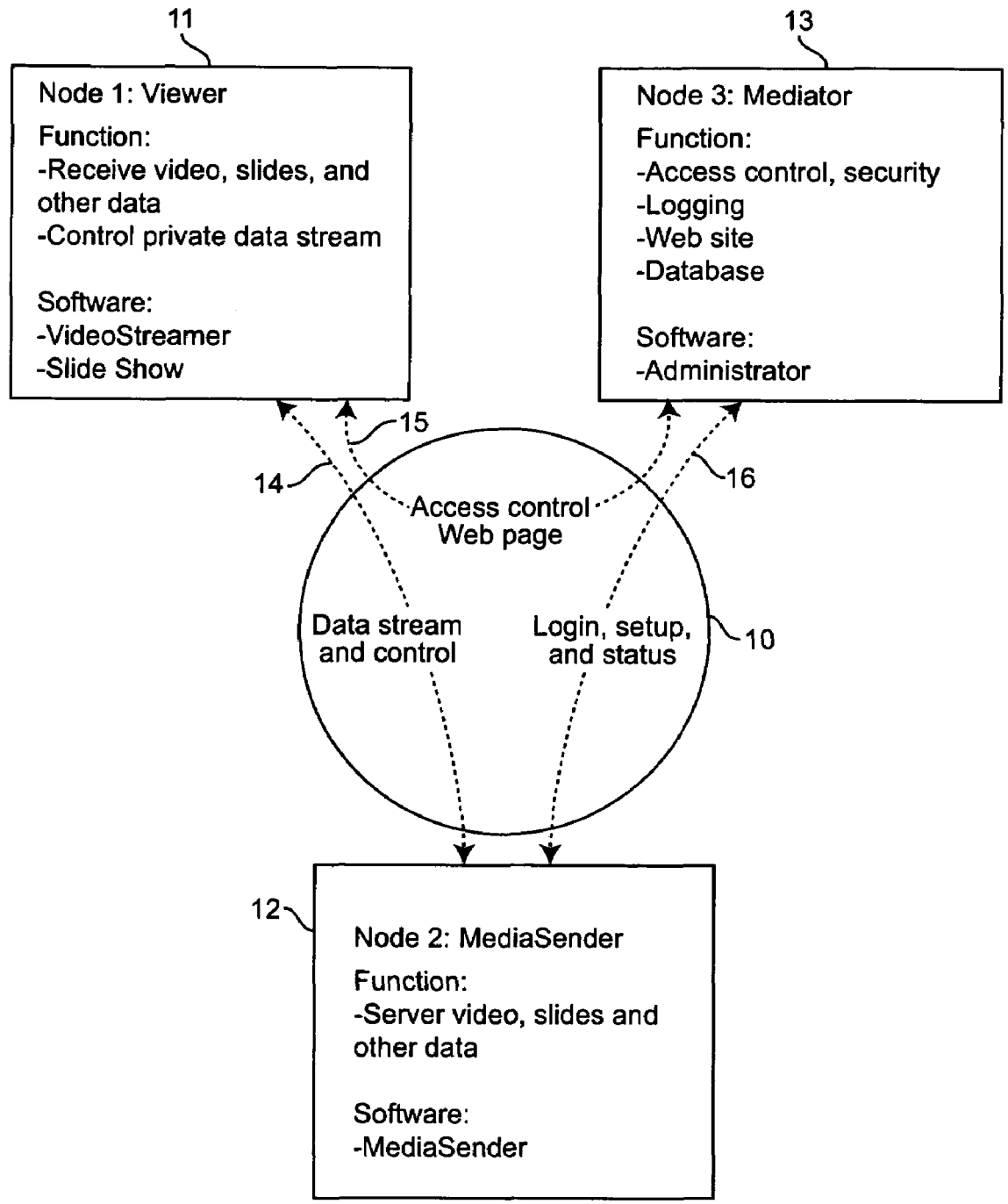
FIG. 1 is a block diagram of the three node architecture implemented by the invention.

The structure of the architecture is best described using a series of illustrations, in which FIG. 1 illustrates the structure of the Three Node Interconnected Architecture as implemented in a preferred embodiment. As opposed to a Three-Node Linear Architecture, the client (Viewer Node 11) and the server (MediaSender Node 12) communicate directly with each other over the Internet 10 for the data transfer, as shown by data stream and control item 14. A Three-Node Linear Architecture only has lines of communication running between MediaSender to Mediator Node and Viewer to MediaSender. The Three-Node Interconnected Architecture puts the bandwidth-intensive communications between the two nodes that require it (MediaSender 12 and Viewer 13) without having to stream information through the Mediator Node in the middle, but at the same time offers the benefits of the control and security of a Mediator Node which communicates directly with the Viewer Node 11 (via item 15) and directly with the MediaSender Node 12 (via item 16).

Figure 2:
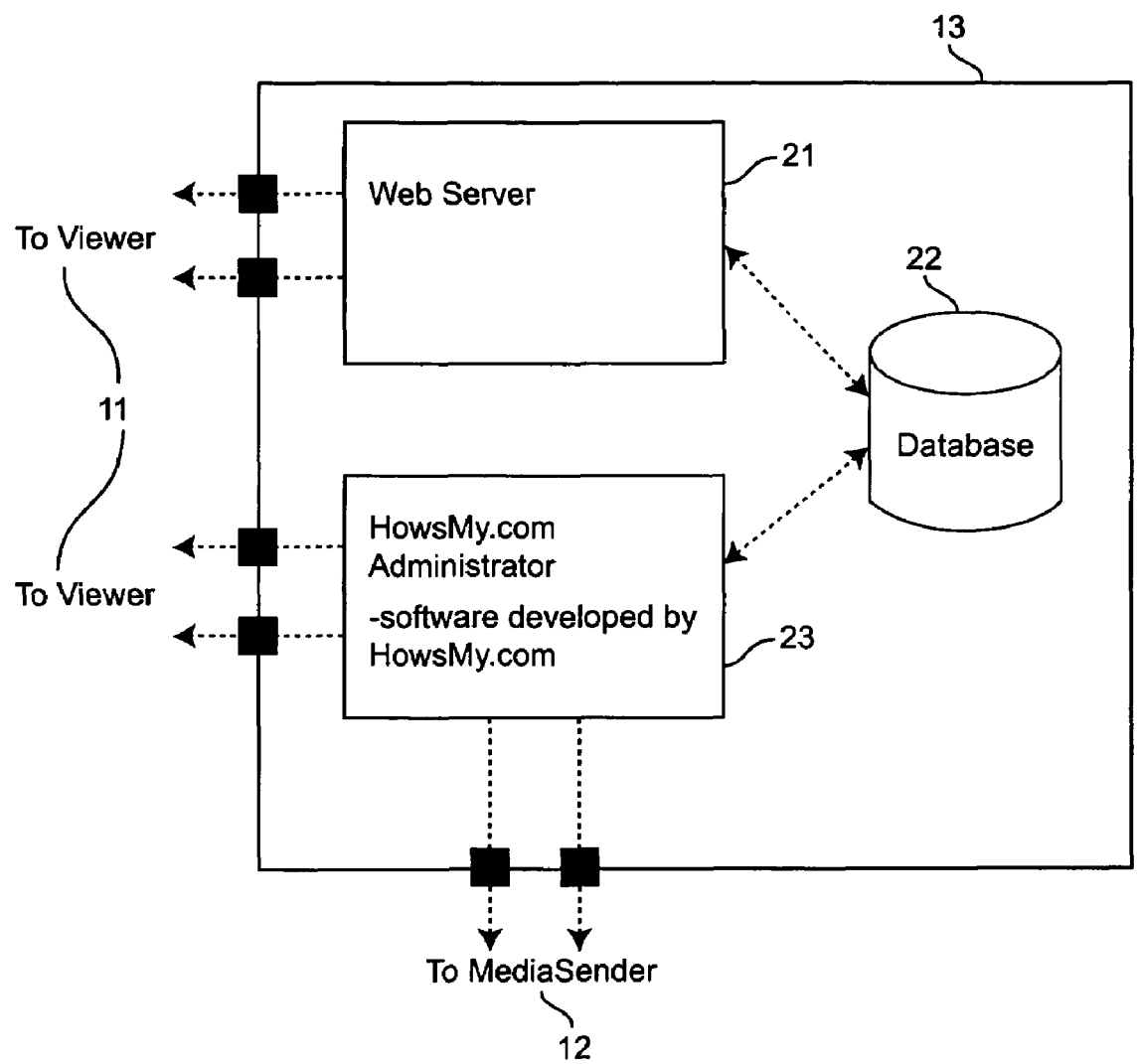
FIG. 2 is a schematic showing the structure of the Mediator Node of the invention.

FIG. 2 illustrates the functional composition of the Mediator Node 13 as realized in a particular system made available over the Internet at the HowsMy.Com web site. The node consists of three parts: the Web Server 21, the Database 22, and the HowsMy.com Administrator 23. The Web Server 21 on the Mediator Node is necessary because this is the means through which a Viewer requests a particular data stream and receives the Viewer applet. The authentication information from the Viewer 11 is passed to the Database 22 using the Web Server 21. The Database 22 is the information repository between the Web Server 21 and the Administrator 23. It stores information concerning the Internet location and status of the MediaSender 12, the identity and session information of the Viewer 11, and all of the necessary security information. This software communicates to the Viewer applet and to the MediaSender over the TCP/IP network 10 (not shown in FIG. 2) using secure tokens or keys. It is used to send and receive setup, login, and status information. This Administrator component 23, like the Web Server 21, communicates directly to the Database 22. An implementation of the invention on a particular system can contain multiple instances of each component as the requirements of the system dictate and each component can reside on the same or different physical servers and networks.

Figure 3:
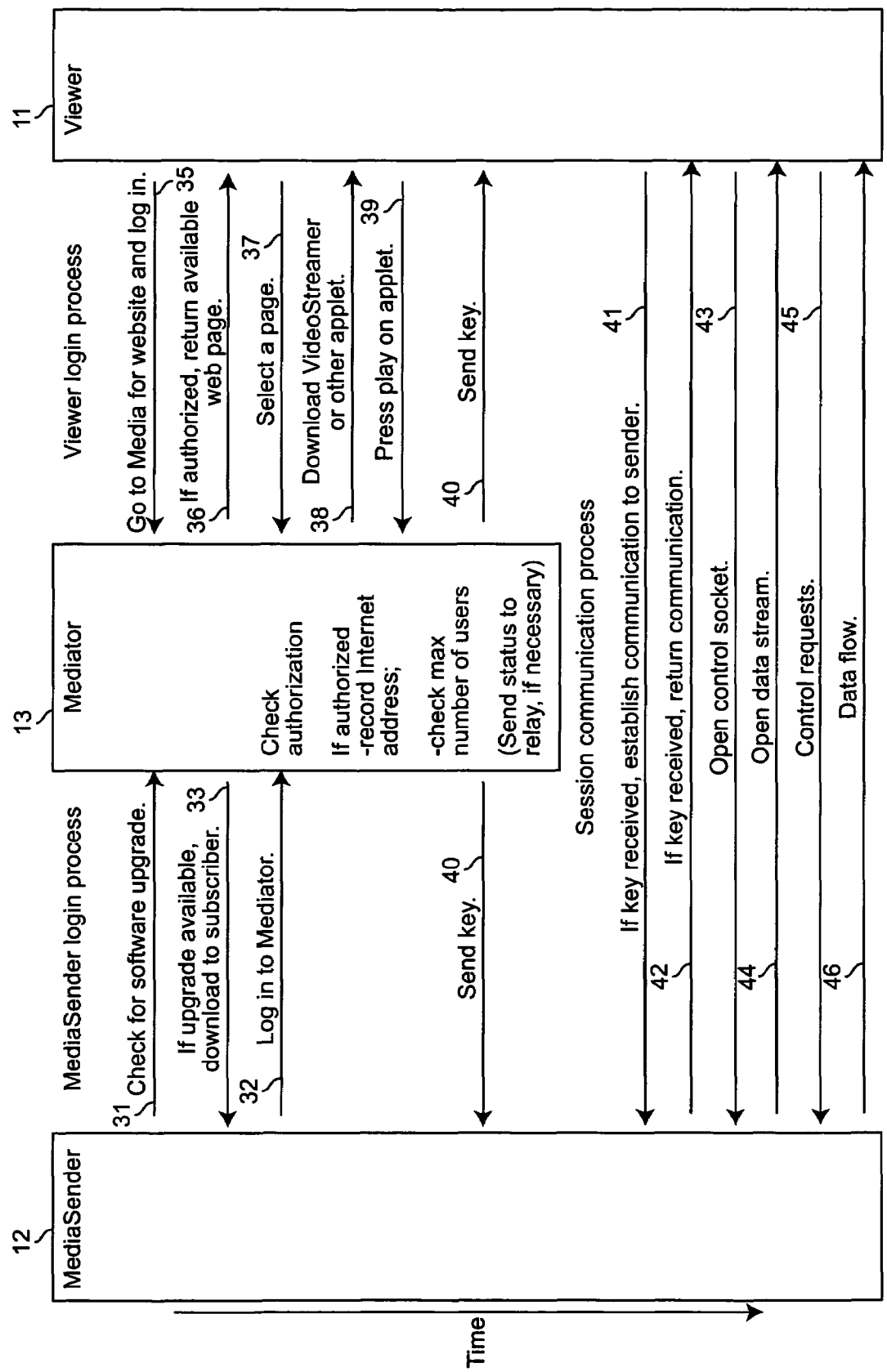
FIG. 3 is a communications flowchart for the three node architecture implemented by the invention.

FIG. 3 illustrates a sequence of the interaction between the Viewer Node 11, MediaSender 12, and the Mediator Node 13 as the invention is realized in the HowsMy.com system, but other implementations of the Interconnected Three-Node Architecture may have different communication processes, as will be evident to one skilled in the art. First, the MediaSender 12 that provides the data stream must register itself with the Mediator Node 13. This process consists of two steps: software upgrade 31 and login 32.

The first step, the Software Upgrade 31, uses versioning control to compare the software running on the MediaSender 12 with the latest functioning version. When the MediaSender 12 connects to the upgrade port of the Mediator Node 13, it sends a token containing the currently installed version number. If it is found that the MediaSender 12 does not have the latest version, a TCP socket is opened and the new software is automatically transferred 33 to the MediaSender Node 12 and the MediaSender software is restarted.

The second step of the MediaSender login process is for the MediaSender Node 12 to register itself with the Mediator Node 13 by sending 32 an encrypted token to the login port of the Mediator Node 13. This token contains information such as the username, password, data stream ID, and the Internet addresses and TCP ports used by the MediaSender 12. When the Mediator Node 13 receives this information, the authentication information is compared against that which is stored in the database 22 (not shown in FIG. 3). If it matches, the remainder of the information in the token is stored in the database 22 and a secure key is sent back to the MediaSender software, unlocking it. If the authentication was unsuccessful, the key will not unlock the MediaSender software, but instead present a message explaining the error.

The Viewer 11 requests to view a data stream by going to the Web Site on the Mediator Node 13 and logging in 35. The authentication information is compared to that stored in the database 22. If it matches, the Viewer 11 receives 36 a list of data streams that he or she is allowed to access. When the Viewer 11 selects one 37, the Web Server 21 (not shown in FIG. 3) sends 38 software to the Viewer 11. In the HowsMy.com system this software is a Java applet, but in other implementations of the invention other video streamer software could serve as the receiver of the data stream that will be sent by the MediaSender 12. When the Viewer 11 begins the communication using the applet, the first step is to authenticate itself once again 39 as an added security precaution. If the authentication was granted, the Mediator Node sends 40 an encrypted key to both the MediaSender 12 and the Viewer 11, notifying each end of the next communication process that they are allowed to talk to each other.

The Mediator Node 13 is now out of the direct communication process. With both the MediaSender and Viewer ready to talk to each other, the Viewer opens 41 a control socket to the MediaSender, notifying it of its identity and Internet address. At this point it sends the secure token given to it by the Mediator Node 13, verifying that it has permission to receive data. If the MediaSender does not receive a secure token or the token is not valid, it does not transmit data. This control socket remains open so that the Viewer can send 45 requests to the MediaSender to change parameters in the data stream. With the control socket open 43, the MediaSender 12 then opens 44 a socket to the Viewer 11. This socket is used to stream 46 the data to the Viewer 11. This bidirectional communication process continues until either the Viewer or the MediaSender ends it. When the process is ended, a status token is sent by both the Viewer 11 and the MediaSender 12 to the Mediator Node 13 to let the system know that the communication process has ended.

Figure 4:
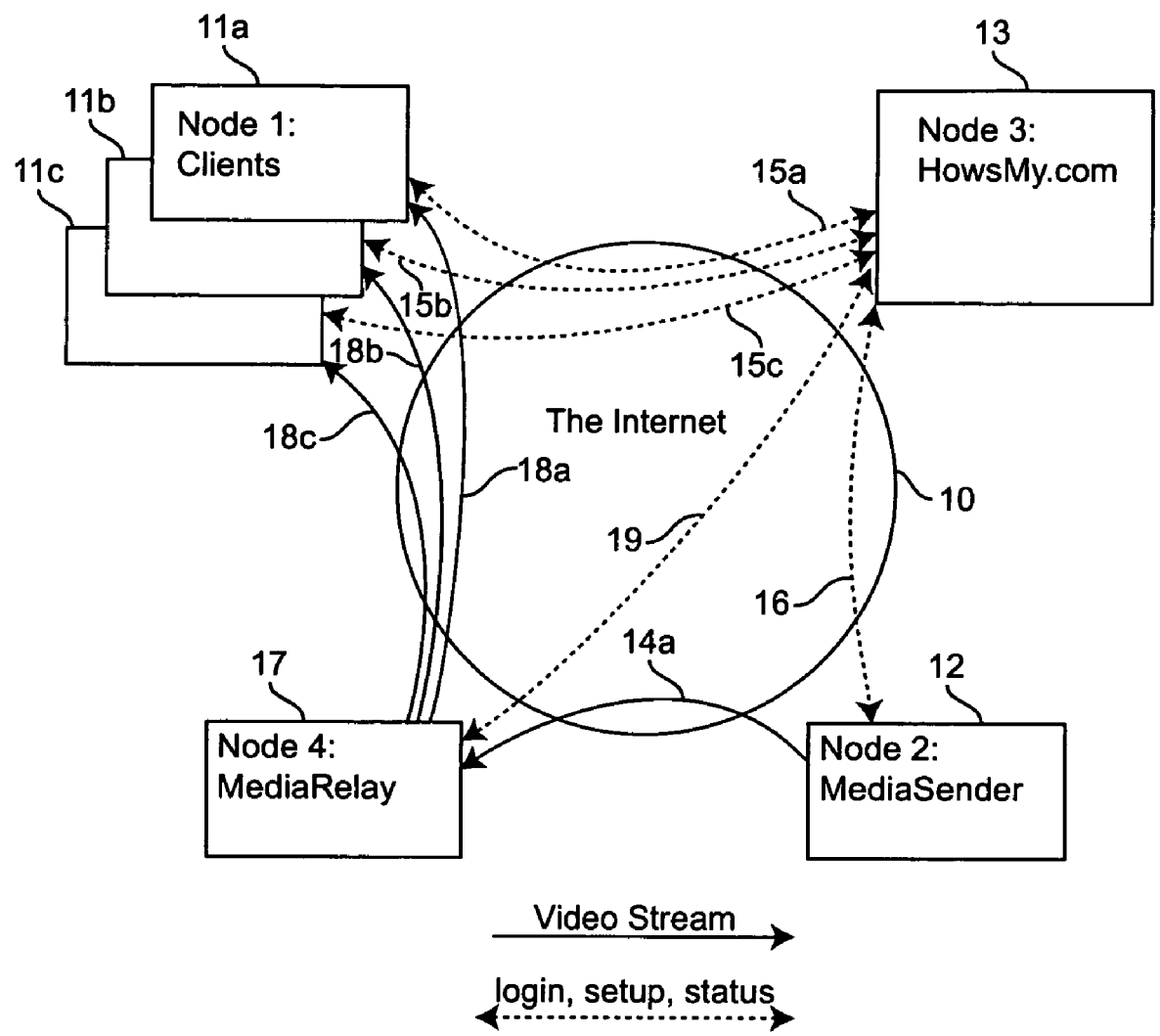
FIG. 4 is a schematic showing the invention's optional MediaRelay feature.

The invention provides an optional fourth node in the architecture as an extra service: the MediaRelay Node 17 as shown in FIG. 4. This server 17 is connected to the Internet 10 with broadband access. In order to use a MediaRelay server 17, a subscriber/Sender 12 notifies the HowsMy.Com Mediator 13, which then communicates 19 over the Internet 10 to configure the MediaRelay 17 for the time required. This configuration is completely controlled by the Mediator 13, preventing unauthorized access. When the subscriber/Sender 12 logs into the Mediator 13 with their MediaSender software, the video steam is sent 14a directly to the MediaRelay 17 instead of a Viewer 11. To watch the video stream, Viewers (11a, 11b, 11c, respectively) directly connect (18a, 18b, 18c, respectively) to the MediaRelay 17 instead of the MediaSender 12. All of the connections are handled transparently to the subscriber/Sender 12 and the Viewers (11a, 11b, 11c). This feature allows a subscriber to send a single video stream over their connection to the Internet, which would then be "relayed" to many viewers at once.

The MediaRelay 17 has a second very important purpose. With the decreased availability of Internet addresses to ISPs, some of them are resorting to internal, private, or "10" networks for their customers. People inside of the firewall on these networks cannot host their own Web sites or provide other Internet services to those outside of the private network. The present invention offers the MediaRelay as a solution to allow those on internal networks to provide video to the outside. The ISP would host the MediaRelay on its firewall or DMZ (a set of computers that are given static Internet addresses and correctly route information from the internal network to the outside Internet). The MediaRelay residing on the DMZ will provide the communications and the video stream between the MediaSender on the internal network and the user wanting to view the video on the Internet.

FURTHER DESCRIPTION OF A PARTICULAR EMBODIMENT

The Invention has been realized in the creation of the HowsMy.com System. The system uses the Interconnected Three Node Communication Architecture for the purpose of allowing the average Internet user to securely provide live streaming video to a viewer using a World Wide Web Browser. The HowsMy.com system implementation is further described in the appended source code, pages 1 through 451, incorporated herein by reference.

The viewer applet, the MediaSender, and the HowsMy.com Administrator part of the Mediator Node have all been written using the Java programming language. Java from Sun Microsystems, Inc. includes the programming language; a compiler, which compiles Java source code into byte codes which represents a Java virtual machine; and a run-time interpreter, which can be made to reside on any computer that can translate these Java byte codes into a run-time object code (machine-level instructions) for the particular computer. Although other languages such as C/C++ could have been used to realize the Three-Node Interconnected Architecture, Java was chosen for its security, portability, maintainability, and robustness.

Java has internal support for the use of TCP socket communication. Sockets are used to send encrypted serialized objects that serve as the authentication, setup, and status vehicles of communication. Serialized objects are self-contained binary data packets that contain the fields of information needed for communication. Each object can hold multiple fields. The socket on the receiving end takes this data packet and extracts and decrypts the information. The realization also uses Java sockets for the two-way communication socket between the Viewer and the MediaSender used to transmit the data and to receive the control requests and responses.

Customers will subscribe online to the HowsMy.com service, typically after receiving a free trial offer through a marketing channel or finding the site based on other marketing methods. Each subscriber/Sender will download and install the MediaSender software on his or her computer. Subscribers will be responsible for acquiring and attaching a web cam or camcorder to their computer, although the web site will offer online guidance in this area and provide links to hardware vendors. Subscribers must also have an Internet Service Provider (ISP). The connection can be as simple as a 28.8 kbps dial-up modem; however, faster access such as provided by cable modem or DSL is preferable for good image quality and a high refresh rate.

After installing the hardware and software, the prototypical customer will start the MediaSender program and leave the camera on and pointed to whatever he wants to monitor. From a remote computer, he will then access the Mediator web site as a Viewer and log in with his password. After a few seconds, the Java-based client software will load, a graphic interface will appear, and the video (and audio) will begin to play.

The user will see true streaming video, not just periodically updated snapshots. He will be able to adjust the image quality and frame rate and will be able to selectively archive images and save them to disk locally. In addition to the video window, the viewer interface includes a panel for archived slides.

For business customers, the system will be a little different. A day care center, for example, will set up whatever number of cameras it deems desirable in order to provide the desired coverage. One or more computers may be required, depending on a number of factors. The businessperson then provides passwords to his customers so that they may view the facility remotely at their convenience. He may charge for the service, bundle it as a premium service, or provide it free. The business customer may retrieve usage reports and itemized invoices by logging on to the Mediator web site.

In order to see how the three nodes function, it is useful to step through how a subscriber and viewer would use the system after the software and hardware and the Mediator accounts are configured.

First, the subscriber/Sender connects to the Internet and turns on the HowsMy.com MediaSender. The MediaSender connects to the Mediator and first checks to see if there is a software upgrade. If so, the software is automatically downloaded and the server restarts itself and connects to the Mediator again. The Mediator Administrator checks all of the necessary permissions for security reasons and registers the Sender's server as being active and ready to receive Viewers. During this stage, the Mediator Administrator software records all necessary Internet addressing information so the client Viewer will be able to find the Sender's server, even though the Sender's server may have a dynamic Internet address.

Second, the Viewer will then log into the Mediator node either directly on the Mediator web site or linked through the web site of a business customer providing the Mediator service. The Viewer is then presented a list of Mediator content that he has permission to view.

After the Viewer selects a stream to view, he is presented the Java applet embedded in the web page. It will load and then the user can start the stream. The client then connects to Mediator which checks the permissions a second time for even more security. If the user is allowed to view the video, a new session is started which tracks the length of time the viewer is watching this particular stream. Then the Mediator Administrator sends a key to unlock the MediaSender, which then begins to stream the video directly to the viewer without that video stream being sent through Mediator. This direct connection allows each Viewer attached to that one stream to independently control quality (e.g. by regulating frame rate) and other settings.

When the Viewer disconnects by either stopping the applet, changing Web pages, or closing the browser, the stream will be shut down and keys will be sent to the Mediator both by the Viewer and the MediaSender to close the session and record the time spent watching. This ability enables pay-per-view billing.

All of the HowsMy.com system software has been designed with several principles in mind, such as maintainability, robustness, and modularity. The first two principles are self-evident, but the modularity built into the system has supreme importance. This allows future iterations of the software to maximize software reuse, easily incorporate new modules, and to easily enhance parts of the system without affecting other areas. HowsMy.com has several components where modularity is stressed: the video capture protocol, the video format, the transfer protocol, and the database. The HowsMy.com system can capture and format the video in different formats. It can support multiple transmission protocols such as UDP, RTP, and RTSP in addition to TCP. It can work with a different database such as Oracle instead of SQL Server. This capability allows the software to grow, stay on the cutting edge, and incorporate new features.

The invention's architecture and the HowsMy.com software's modularity also allow the system to deliver more than just one-way high-quality streaming video. This mechanism and architecture can be used to securely deliver synchronized audio and any other kind of digital information, such as text-based chat.

The HowsMy.com client components include two applets: the VideoStreamer and the SlideShow. The VideoStreamer provides live streaming video to the Viewer. It provides: control of the video quality and frame rate; independent controls for each viewer; the ability to stop, start, and pause the video stream; the ability to change through multiple cameras if the MediaSender has more than one camera attached; the ability to limit the length of time a viewer gets to watch, controlled by the HowsMy.com Administrator; the optional ability to archive frames to the SlideShow; and additional features such as motion detection and alerting.

The stopping and starting of the stream is a very important feature which allows pay-per-view and allows the viewer to stay on the page and control the stream without having to leave the page and reload the applet upon returning.

The HowsMy.com SlideShow allows the subscriber to present JPEG or GIF images that are stored on their local system. The SlideShow has the following features: the subscriber can select and order the images to be viewed; the ability to show JPEGs and GIFs or text saved as JPEG or GIF; the ability to move forward or reverse in the image queue; images are not uploaded until requested saving load time and bandwidth; the title of the slide which can be hidden or displayed by the viewer.

The architecture of the invention supports further implementation applets such as text-based user-to-user chat.

The HowsMy.com MediaSender is a sophisticated Java application that provides the video stream and slides. It can be run from a command line or by using a graphical user interface. This same software can perform as a MediaRelay if it is configured as such by use of the configuration file. The software has many important features: the ability to host multiple cameras within a single page or applet; the ability to have multiple configurations, meaning more than one page or applet can be served by a single instance of the MediaSender; the ability to handle multiple simultaneous users each with their own configurable stream; the ability to name and configure video sources; security and password protection; video previews; multi-threaded, robust, modular design; configuration information is stored on a file and can be used to turn a MediaSender into a MediaRelay; control over who can view the video and the number of simultaneous viewers; can register newly-installed video devices; the software is downloaded as an executable file that provides automatic installation; automatic software updates The automatic updating feature is a unique software delivery mechanism based upon Java versioning technology that allows the MediaSender to automatically be updated upon restart of the software. This makes updates easy for both HowsMy.com and the subscriber/Sender. Also built into the Sender's server are multiple layers of restarts including clearing out the application and restarting but not exiting the application completely.

The HowsMy.com Administrator can reside on HowsMy.com computers or on third-party HowsMy.com service providers. This powerful Java-based server communicates with the back-end database and provides the necessary communication, control, and security links between the Viewer and the MediaSender software at the Sender's node. The Administrator has several important functions and features: the ability to provide setup and status information between the viewer, MediaSender, and MediaRelay; the ability to download software updates to subscribers; communicates with the back-end database to extract security and user information (this component is configurable and modular so that different databases may be used); handles security and passing of keys; the ability to remotely restart or shutdown all active MediaSenders or specific ones; can track session and usage information and store it in the database.

In sum, the invention's architecture is a unique development and allows ease-of-use and configuration for the subscriber and viewer, enhanced security, user tracking and logging, and a minimization of hardware and bandwidth requirements for the Mediator.

While the invention has been described in terms of a preferred embodiment, those skilled in the art will recognize that the invention can be practiced with modification within the spirit and scope of the appended claims.

Having thus described my invention, what I claim as new and desire to secure by letters patent is as follows:

1. A system for viewer managed point to point data streaming over a network, comprising:
    a Sender node for generating streaming data from a target site, said Sender being a client having an address on a network;
    a Viewer node for monitoring said target site by controlling the generation of streaming data by the Sender node and viewing said streaming data, said Viewer being a client on said network; and
    a Mediator node for remotely authenticating said Viewer and Sender, locating for said Viewer said Sender address, transmitting session keys to the Viewer and the Sender, and recording session information in a repository, the session keys enabling the Sender and the Viewer to establish a point-to-point connection over the network,
    wherein said connection is for the streaming of said streaming data by the Sender to the Viewer under said Viewer control, and
    wherein said Viewer control includes asynchronous initiating, stopping and restarting said streaming without intervention by the Mediator node after said transmission of the session keys.

2. A system as in claim 1, wherein said network is a TCP/IP network.

3. A system as in claim 1, wherein said streaming data is multi-media.

4. A system as in claim 1, wherein said Sender's address is dynamic.

5. A system as in claim 1, wherein said session information in said repository at said Mediator node includes IP addresses for said Sender and said Viewer and said session keys, and wherein said Mediator node provides a static Internet location for accessing the system.

6. A system as in claim 1, wherein said Sender further comprises means for accepting requests from authorized Viewers and means for streaming said data to said authorized Viewers.

7. A system as in claim 6, further comprising a plurality of Mediator nodes, each Mediator node serving a plurality of Senders and a plurality of Viewers.

8. A system as in claim 7, wherein a first Sender further comprises a MediaRelay for retransmitting to a Viewer or a second Sender a data stream generated by said first Sender or received from a third Sender.

9. A system as in claim 7, wherein each said Mediator node provides security.

10. A system as in claim 9, wherein said security is implemented by encrypted communication tokens, each said token containing an address of a designated Sender and being readable by a designated Viewer, said designations being mediated at each said Mediator node.

11. A system as in claim 1, wherein said streaming data is generated and transmitted in real-time.

12. A system as in claim 1, wherein said Sender is implemented by MediaSender software and said software is updated automatically from said Mediator node.

13. A system as in claim 12, wherein said software is constructed using platform independent technology.

14. A method for viewer managed point to point data streaming over a network between a Sender and a Viewer, comprising the steps of:
    registering Sender information with a Mediator node, said Sender information including at least a location of said Sender and a list of Viewers having access rights;
    authenticating said Sender by said Mediator;
    requesting access to said Sender by a Viewer;
    logging said Viewer's request with said Mediator node, said logging validating said Viewer against said list of Viewers;
    transmitting said location information to said validated Viewer and notifying said Sender of said validated Viewer;
    downloading by said Viewer of a videostreamer from said Sender;
    establishing by said Viewer and said Sender a point-to-point connection, said connection being for streaming of streaming data by said Sender to said Viewer; and
    controlling by said Viewer of said Sender streaming of said streaming data, using said videostreamer and without intervention by said Mediator node, said Viewer control including asynchronous initiating, stopping and restarting said streaming data.

15. The method of claim 14, wherein said network is a TCP/IP network.

16. The method of claim 14, wherein said streaming data is multi-media.

17. The method of claim 14, wherein said Sender's address is dynamic.

18. The method of claim 14, wherein a repository in said Mediator node monitors and records session information, said session information including IP addresses for said Sender and said Viewer, and session keys for access control, and wherein said Mediator node provides a static Internet location for accessing the system at a web site associated with said Mediator node.

19. The method of claim 14, further comprising the steps of:
    registering a second Sender's information by said Mediator node, said information including at least a location of said second Sender, said second Sender having a MediaRelay for retransmitting said videostreamer to said Viewer;

after said logging of said Viewer's request, transmitting to said validated viewer said second Sender's location information, said videostreamer then being transmitted by said Sender to said second Sender and downloaded to said Viewer by said MediaRelay.

20. A system for viewer managed point to point data streaming over a network between a Sender and a Viewer, comprising:

means for registering Sender information with a Mediator node, said Mediator node containing a repository which monitors and records session information, said Sender information including at least a location of said Sender and a list of Viewers having access rights;

means for authenticating said Sender by said Mediator;

means for requesting access to said Sender by a Viewer;

means for logging said Viewer's request with said Mediator node, said logging validating said Viewer against said list of Viewers;

means for transmitting said location information to said validated Viewer and notifying said Sender of said validated Viewer;

means for downloading by said Viewer of a videostreamer from said Sender;

means for establishing by said Viewer and said Sender of a point-to-point connection, said connection being for streaming of streaming data by said Sender to said Viewer; and means for controlling by said Viewer of said Sender streaming of said streaming data, using said videostreamer and without intervention by said Mediator node, said Viewer control including asynchronous initiating, stopping and restarting said streaming data, wherein said Sender provides its address to said Mediator node when said direct transmission is started or restarted by said Viewer.

21. A system for viewer managed point to point data streaming over a network, comprising:

means for transmitting a data stream from a Sender to one or more Viewers, optionally via one or more Relays;

means for registering information of said Sender with a Mediator node, said information including said Sender's location on said network and said Sender's availability for said transmission, said Mediator node containing a repository which monitors and records session information;

means for said one or more Viewers to request access to said Sender from a Mediator node;

means for said Mediator node to provide said location information to said one or more Viewers if said Sender is available; and means for establishing by each of said one or more Viewers and said Sender of a point-to-point connection, each said respective connection being for said transmission of said data stream by said Sender to a respective Viewer;

wherein each said transmission to a respective one of said one or more Viewers is initiated and controlled by said respective one of said one or more Viewers, said Viewer initiation being at a web site associated with said Mediator node, said Viewer control including asynchronous initiating, stopping and restarting by said Viewer of said respective transmission without intervention by said Mediator node, and wherein said Sender provides its address to said Mediator node when said direct transmission is started or restarted by said Viewer.

22. A system as in claim 21, wherein said providing means use encrypted tokens for security and wherein said Viewer control also includes control of a video quality and a frame rate, and an ability to change through multiple cameras.

* * * * *